US006884328B2

(12) United States Patent
Litvinov et al.

(10) Patent No.: US 6,884,328 B2
(45) Date of Patent: Apr. 26, 2005

(54) SELECTIVE ANNEALING OF MAGNETIC RECORDING FILMS

(75) Inventors: Dmitri Litvinov, Pittsburgh, PA (US); Nisha Shukla, Pittsburgh, PA (US); Erik Bjorn Svedberg, Glenshaw, PA (US); Sakhrat Khizroev, Pittsburgh, PA (US); Dieter K. Weller, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 90 days.

(21) Appl. No.: 10/305,456

(22) Filed: Nov. 27, 2002

(65) Prior Publication Data

US 2003/0113582 A1 Jun. 19, 2003

Related U.S. Application Data

(60) Provisional application No. 60/334,240, filed on Nov. 29, 2001.

(51) Int. Cl.[7] ............................ C23C 14/34; B05D 3/02
(52) U.S. Cl. .................... 204/192.2; 427/595; 427/598; 427/130; 427/131; 427/383.1; 427/372.2
(58) Field of Search ............................. 427/595, 598, 427/130, 131, 132, 383.1, 372.2; 204/192.12, 192.2, 192.15

(56) References Cited

U.S. PATENT DOCUMENTS

| 4,303,455 | A |   | 12/1981 | Splinter et al. .............. 148/1.5 |
|---|---|---|---|---|
| 4,448,843 | A | * | 5/1984 | Yamada et al. ............. 428/336 |
| 4,545,828 | A |   | 10/1985 | Schoen et al. .............. 148/111 |
| 5,529,814 | A |   | 6/1996 | Tan et al. ................... 427/547 |
| 5,604,030 | A | * | 2/1997 | Yamane et al. ............. 428/332 |
| 5,693,199 | A | * | 12/1997 | Bourez et al. ......... 204/192.12 |
| 5,707,466 | A |   | 1/1998 | Atwater et al. ............. 148/525 |
| 5,824,409 | A |   | 10/1998 | Sellmyer et al. ............ 428/332 |
| 6,033,491 | A | * | 3/2000 | Lin ........................... 148/108 |
| 6,051,283 | A |   | 4/2000 | Lee et al. ................... 427/553 |
| 6,059,936 | A |   | 5/2000 | Cathey et al. ......... 204/157.15 |
| 6,139,907 | A |   | 10/2000 | Sellmyer et al. ............ 427/128 |
| 6,165,699 | A |   | 12/2000 | Bauer et al. ................. 430/349 |
| 6,172,322 | B1 |   | 1/2001 | Shang et al. ........... 219/121.43 |
| 6,197,701 | B1 |   | 3/2001 | Shue et al. ................. 438/763 |
| 6,316,123 | B1 |   | 11/2001 | Lee et al. ................... 428/641 |
| 6,472,333 | B1 |   | 10/2002 | Xia et al. ................... 438/758 |
| 6,486,057 | B1 |   | 11/2002 | Yeh et al. |
| 6,541,131 | B1 | * | 4/2003 | Ristau .................... 428/694 T |
| 6,566,414 | B1 | * | 5/2003 | Takeshima et al. ......... 522/100 |

* cited by examiner

Primary Examiner—Steven Versteeg
(74) Attorney, Agent, or Firm—Alan G. Towner, Esq.; Pietragallo, Bosick & Gordon

(57) ABSTRACT

Magnetic films are annealed by radio frequency (RF) radiation. During the RF annealing process, the layers may be subjected to a magnetic field in order to control their anisotropy axes. The RF annealed layers are useful for applications such as longitudinal and perpendicular magnetic recording layers of magnetic data storage media.

23 Claims, 3 Drawing Sheets

SELECTIVE ANNEALING OF MAGNETIC RECORDING FILMS

CROSS REFERENCE TO RELATED APPLICATION

This application claims the benefit of U.S. Provisional Patent Application Ser. No. 60/334,240 filed Nov. 29, 2001.

FIELD OF THE INVENTION

The present invention relates to magnetic recording films, and more particularly relates to rapid selective annealing of such films utilizing radio frequency (RF) induction heating.

BACKGROUND INFORMATION

Longitudinal magnetic recording systems are well known. In longitudinal magnetic recording, the recording head writes and reads data on a disk having a magnetic recording layer. When data is written, magnetization in the magnetic recording layer is aligned along the tracks of the disk in a plane that is parallel with the plane of the magnetic recording layer. Longitudinal recording in its conventional form has been projected to suffer from superparamagnetic instabilities at densities above about 40 Gbit/in$^2$.

Perpendicular magnetic recording systems have been developed for use in computer hard disk drives. A typical perpendicular recording head includes a trailing write pole and a leading return or opposing pole magnetically coupled to the write pole. Perpendicular recording media typically include a hard magnetic recording layer and a soft magnetic underlayer which provides a flux path from the trailing write pole to the leading opposing pole of the writer. To write to the magnetic recording media, the media is moved past the recording head and magnetic flux passes from the write pole tip, through the hard magnetic recording track, into the soft underlayer, and across to the opposing pole.

Both longitudinal and perpendicular magnetic recording systems utilize thin magnetic films in the recording media. A need exists for magnetic films with improved magnetic properties which will allow higher recording densities.

SUMMARY OF THE INVENTION

The present invention provides a method of selectively annealing layers of magnetic media using RF heating. In this process, the RF radiation is predominantly absorbed by certain layers of the magnetic media, such as the recording layer(s), soft underlayer(s), seed layer(s), etc., thereby eliminating the side effects of furnace annealing in which the entire structure is uniformly subjected to elevated temperatures during the annealing process.

An aspect of the present invention is to provide a method of annealing a layer of magnetic recording material. The method includes providing a layer of magnetic recording material, and annealing the layer with radio frequency radiation.

Another aspect of the present invention is to provide a magnetic recording material comprising a layer of radio frequency annealed nanoparticles.

A further aspect of the present invention is to provide a magnetic recording medium including a substrate and a radio frequency annealed magnetic recording layer on the substrate.

These and other aspects of the present invention will be more apparent from the following description.

DETAILED DESCRIPTION

Figure 1:
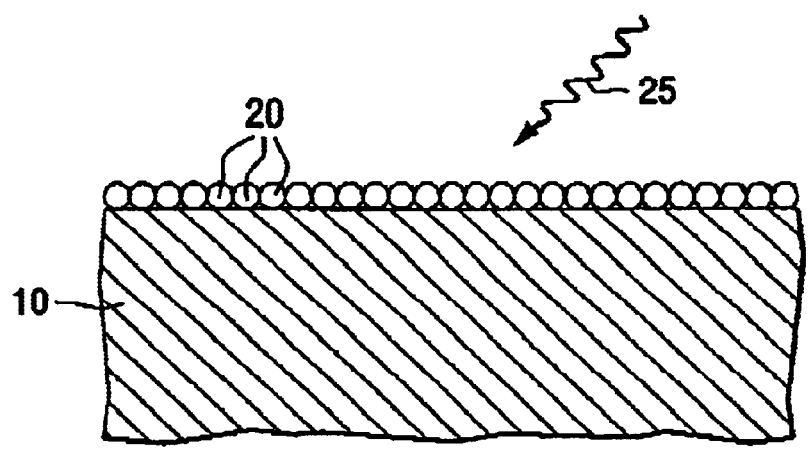
FIG. 1 is a partially schematic side view of a substrate with a layer of nanoparticles deposited thereon, illustrating selective heating of the nanoparticle layer by radio frequency radiation in accordance with an embodiment of the present invention.

FIG. 1 schematically illustrates a substrate 10 having a layer of nanoparticles 20 deposited thereon. The nanoparticles 20 may comprise any material which, upon annealing, possesses desired magnetic properties for data storage. For example, the nanoparticles 20 may comprise polycrystalline FePt in a random cubic phase. The nanoparticles typically have an average diameter of from about 1 to about 50 nm, typically less than about 10 nm. Although the nanoparticle layer 20 shown in FIG. 1 is illustrated as discrete particles, it is to be understood that the nanoparticle layer 20 may alternatively include a continuous or semi-continuous film. Furthermore, the nanoparticle layer 20 may uniformly cover the substrate 20, or may be provided in the form of a pattern.

The nanoparticle layer 20 may be deposited by standard techniques such as chemical deposition, sputtering, cluster ion-beam deposition, laser ablation, molecular beam epitaxy, spin coating or evaporation. For example, the nanoparticle layer 20 may be deposited directly by chemical synthesis, or the nanoparticles may be pre-formed by chemical synthesis and subsequently deposited. A suitable chemical synthesis technique involves the reduction of platinum acetylacetonate and thermal decomposition of iron pentacarbonyl in the presence of oleic acid and oleyl amine stabilizers in a 1:1 mixture in an oxygen-free environment.

Figure 2:
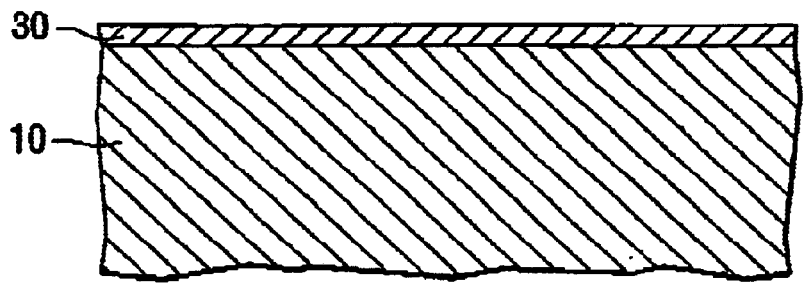
FIG. 2 is a partially schematic side view of a substrate and an annealed magnetic layer on the substrate that has been subjected to radio frequency radiation. The annealed layer has a structure that provides desired magnetic properties for data storage.

In accordance with the present invention, after the nanoparticle layer 20 has been deposited, the layer 20 is subjected to radio frequency radiation 25 in order to directly or indirectly heat and anneal the layer 20. After exposure to the radio frequency radiation 25, an annealed layer 30 is formed, as schematically illustrated in FIG. 2. The nanoparticles will transform their structure when heated but they will not necessarily change into a continuous layer. In contrast, if a continuous layer, instead of nanoparticles, is deposited, it may be transformed to a $L1_0$ structure that essentially remains a continuous layer. The annealed layer 30 typically has a thickness of less than about 500 nm, for example, from about 1 to about 100 nm.

The layers 20 and 30 may comprise any material that possesses the desired magnetic properties upon RF annealing, such as metals, metal alloys and ferrites. The composition of the layers 20 and 30 may be selected such that the initial layer 20 transforms upon annealing to an ordered crystal structure having the desired magnetic data storage properties.

The initial nanoparticle layer 20 may have a random cubic structure that is transformed into an ordered $L1_0$ structure or the like upon RF annealing. In accordance with an embodiment of the present invention, the layers 20 and 30 may be RF absorbent. For example, the layers 20 and 30 may comprise Fe and/or Co. The Fe and Co may be combined with other metals or elements, such as Pt, Pd, Cr, Ta, Cu, Ag, Au and/or O. For example, the layers 20 and 30 may comprise FePt, FePd, CoPt or CoPd in atomic ratios of about 1:1 which possess an $L1_0$ structure upon annealing. In another embodiment, the layers 20 and 30 may comprise CoCrX alloys where X is Pt, Pd, Ta, Nb, B and/or O. In another embodiment, the layers 20 and 30 may comprise multilayers of Fe/Pt, Fe/Pd, Co/Pt, Co/Pd and the like. Such multilayer structures may comprise from 1 to 10 or more of the bi-layers.

Figure 3:
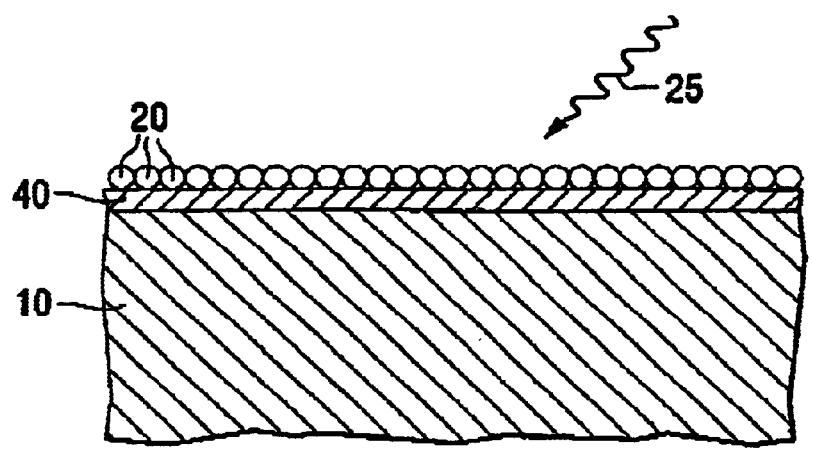
FIG. 3 is a partially schematic side view of a substrate with a layer of seed material and a layer of nanoparticles deposited thereon, illustrating selective heating of the seed layer and/or nanoparticle layer by radio frequency radiation in accordance with another embodiment of the present invention.
Figure 4:
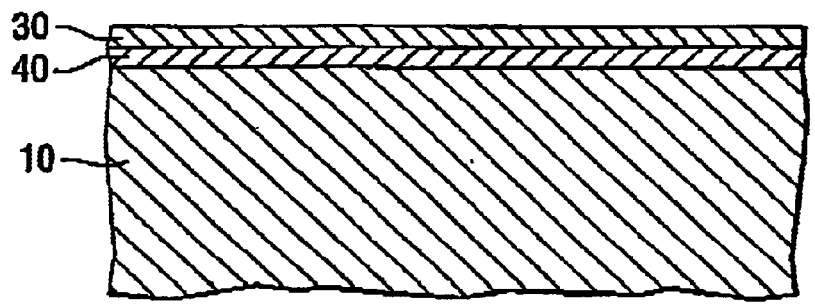
FIG. 4 is a partially schematic side view of a substrate, a seed layer, and an annealed magnetic layer on the seed layer that has been subjected to radio frequency radiation. The annealed layer has a structure that provides desired magnetic properties for data storage.

FIGS. 3 and 4 illustrate an RF annealing process in accordance with another embodiment of the present invention. In addition to the substrate 10 and layers 20 and 30 shown in the embodiment of FIGS. 1 and 2, an additional intermediate layer 40 is provided below the layers 20 and 30 in the embodiment of FIGS. 3 and 4. The intermediate layer 40 may comprise a thin seed layer which facilitates deposition of the nanoparticle layer 20. Such a seed layer may comprise tantalum, doped silicon, barium ferrite, carbon or the like. Alternatively, the intermediate layer 40 may comprise a soft magnetic material, e.g., a layer that may be used as the soft magnetic underlayer of a perpendicular magnetic recording medium. Suitable soft magnetic materials include CoFe, FeAlN, NiFe, CoZrNb, FeTaN, FeCoB, FeCoZr and the like. In the embodiment shown in FIGS. 3 and 4, the RF radiation 25 may be used to selectively heat the layer 20, the layer 40, or both of the layers 20 and 40. When the intermediate layer 40 comprises an RF absorbent material, heat generated in the layer 40 by the RF radiation may be used to anneal the adjacent layer 20.

The substrate 10 shown in FIGS. 1–4 may be made of any suitable material such as glass, silicon, ceramic, quartz, NiP and plastic. The thickness of the substrate 10 is typically significantly greater than the thickness of the layers 20 and 30, for example, at least from about 5 to about 1,000 times thicker. As a particular example, when the substrate 10 is provided as a disk of a computer hard drive, it has a typical thickness of from about 0.2 to about 3 mm. In one embodiment, the substrate may have a relatively low RF absorbance or high electrical resistivity, e.g., the electrical resistivity of the substrate may be greater than the electrical resistivity of the layers 20 and 30. For example, the substrate 10 may have an electrical resistivity of greater than about $10^5$ Ohm-cm. In another embodiment, the substrate 10 may absorb a certain amount of the RF radiation such that the substrate is heated to a temperature which assists annealing of the adjacent layer 20.

Selective radio frequency annealing is achieved in accordance with an embodiment of the present invention by selecting RF parameters, such as frequencies and power levels, which preferentially heat the layers 20 and/or 40. Frequencies of from about 10 kHz to about 300 GHz may typically be used, for example, from about 100 MHz to about 100 GHz. As a particular example, the frequency may be from about 1 to about 20 GHz. The total power of the radio frequency radiation may be selected depending upon the materials being treated, chamber size, number of substrates, etc. For example, the total power may range from about 100 to about 5,000 Watts.

The radio frequency radiation 25 may be applied to the layer 20 for a relatively short time, for example, less than about 5 minutes. For instance, the radio frequency radiation 25 may be applied to the layer 20, for a time of less than about 60 seconds, e.g., from about 0.1 to about 30 or 40 seconds. In a particular embodiment, the radio frequency radiation 25 may be applied for a time of about 1 to about 10 seconds. During the radio frequency radiation process, the layer 20 is heated to a desired annealing temperature. For example, the annealing temperature may range from about 200 to about 900° C., typically from about 350 to about 500° C. for many metallic materials.

During the radio frequency annealing operation, the microstructure of the deposited nanoparticle layer 20 may be converted to a structure having desirable magnetic properties. For example, the radio frequency annealed layer 30 may have an $L1_0$ crystal structure. As a particular example, where the layer 20 comprises FePt, it may be deposited as a polycrystalline cubic structure, but converted to an $L1_0$ structure upon radio frequency radiation. Alternatively, the FePt material may be chemically synthesized in the form of amorphous nanoparticles or randomly oriented cubic structure nanoparticles which are subsequently converted to the $L1_0$ structure upon annealing.

The radio frequency annealed layer 30 possesses favorable magnetic properties. For example, the annealed layer 30 may have a coercivity of greater than about 2,000 Oe, typically greater than about 5,000 or about 10,000 Oe. In addition to relatively high coercivities, the annealed layer may exhibit high anisotropy, low exchange coupling, minimized grain size and grain size distribution, highly decoupled particles or grains, low surface roughness, large structural order by assembly or self-assembly, low transition bit noise and high magnetic saturation. In accordance with the present invention, some or all of these properties may be tailored by the RF annealing process.

When selecting appropriate frequencies and power levels of the radio frequency radiation, the following parameters may be considered.

If a conducting object is placed in an alternating electromagnetic field, the field within the object will generate alternating electrical currents, so called Eddy currents. These Eddy currents are induced a result of Faraday's law of electromagnetic induction:

$$emf = -\frac{d\Phi}{dt},$$

where emf is the electromotive force, an equivalent of the voltage, generated by the time-varying magnetic flux through the object. The currents within the object will generate Joule heat ($\sim emf^2/R$) leading to the temperature increase of the object. Thus, a Joule heat per unit time dissipated on a conducting object is given by $$P_J = \left(\frac{d\Phi}{dt}\right)^2 / R_{\textit{eff}},$$

where $R_{\textit{eff}}$ is an effective resistance of the object. The equation above can be rewritten as $$P_J \propto 4\pi^2 \omega^2 \frac{B^2 a^2}{R_{\textit{eff}}},$$

where B is assumed to follow harmonic oscillations, and a is the area of the object. For a spherical object (approximation of nanoparticles), the above equation becomes $$P_J \propto 4\pi^2 \omega^2 B^2 r^5 / \rho,$$

where r is the radius of the spherical particle, the $\rho$ is the electrical resistivity of the material.

The power of electromagnetic radiation, $P_{RF}$, per unit area is given by $$P_{RF} \propto \frac{1}{c}\frac{B^2}{\mu_0},$$

which allows to rewrite the previous equation as $$P_J \propto P_{RF} \frac{4\pi^2 c \mu_0 r^5 \omega^2}{\rho}.$$

The above equation represents the Joule heat generated in the nanoparticle by externally applied RF radiation. The Joule heat per unit volume is then $$P_J \propto P_{RF} \frac{4\pi^2 c \mu_0 r^2 \omega^2}{\rho}$$

The above equation gives a rate of temperature change of approximately 60° C. per second for a 1,000 Watts RF source operating at 50 MHz frequency, 50 nm nanoparticle size with 10 $\mu\Omega$·cm resistivity which should bring the temperature of a nanoparticle to approximately 600° C. in 10 seconds.

A consideration in choosing an appropriate RF heating source is the absorption spectra of the media that is exposed to RF radiation during annealing of the nanoparticles. To achieve optimum efficiency of the RF annealing system it may be desirable to choose the frequency of RF radiation such that the substrate or other layers of the media have minimal absorption at the selected frequency. This may ensure that most of the RF heating power will be absorbed by the nanoparticles. By selectively RF annealing the particles after they have been deposited on the substrate, the heat will only be produced locally and during a short time, thus reducing the effect of heating of the substrate. This method of heating can also be used to pretreat the particles in solution so that the heating time of the media can be further reduced.

In one embodiment of the present invention, a magnetic field is applied to the layer 20 during the radio frequency annealing operation. The application of an external magnetic field during the RF annealing process may produce anistropy axes in the annealed material. For example, a magnetic field may be applied with conventional equipment in a direction substantially parallel with the plane of the layer 20 when such a field is applied in the plane of the layer 20, the resulting annealed layer 30 may have an easy axis of magnetization in the plane of the layer 30. Such an orientation may be suitable for longitudinal magnetic recording media. Alternatively, the magnetic field may be applied in a direction substantially perpendicular to the plane of the layer 20. When such magnetic field is applied perpendicularly to the layer 20, the resultant annealed layer 30 may have an easy axis of magnetization perpendicular to the plane of the layer 30. Such an orientation may be hard magnetic recording layers of perpendicular magnetic recording media.

The following examples are intended to illustrate various aspects of the present invention, and are not intended to limit the description or claims of the invention.

Layers of FePt were deposited on silicon substrates in the form of nanoparticles having an average size of about 4 nm. The substrates comprised Si (100) wafers with a $SiO_2$ native oxide surface layer. The FePt nanoparticles were provided in a hexane/octane mixture having a volume ratio of about 1:1, which was applied to the substrate by a standard spin coating technique. After evaporation of the solvent, the FePt nanoparticle layer had a thickness of several tens of nanometers.

Coated substrates produced as described above were subjected to radio frequency radiation for periods ranging from a few seconds (e.g., 3 seconds) to a few minutes (e.g., 5 minutes) in a cavity exposed to a total of 1,300 W of RF energy delivered from a magnetron source operating at 2.45 GHz. The cavity was evacuated to a few mTorr of $N_2$ gas after the oxygen was removed in order to protect against oxidation of the material.

Figure 5:
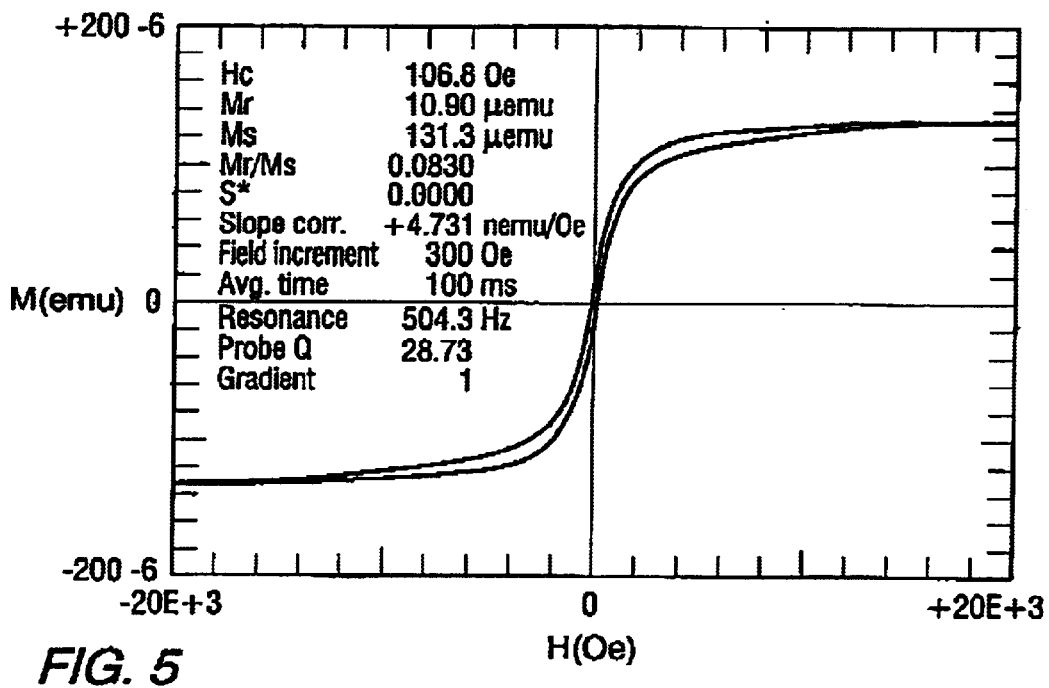
FIG. 5 is a hysteresis loop illustrating magnetic properties of as-deposited layer of FePt nanoparticles prior to annealing.
Figure 6:
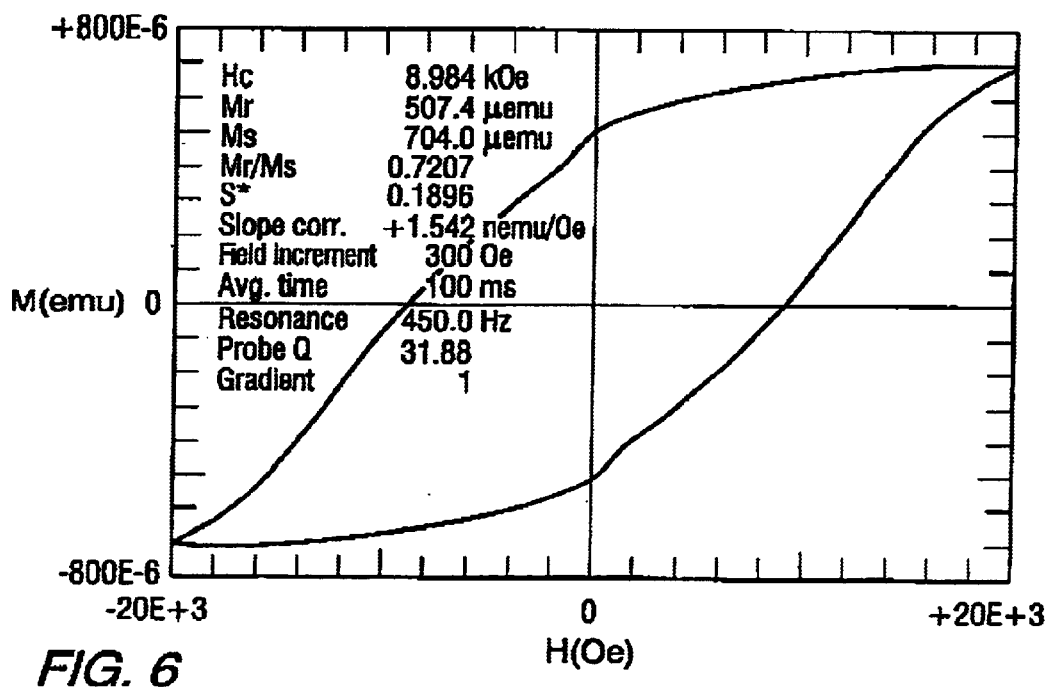
FIG. 6 is a hysteresis loop illustrating magnetic properties of a layer of FePt nanoparticles after it has been annealed by RF radiation for 6 seconds.
Figure 7:
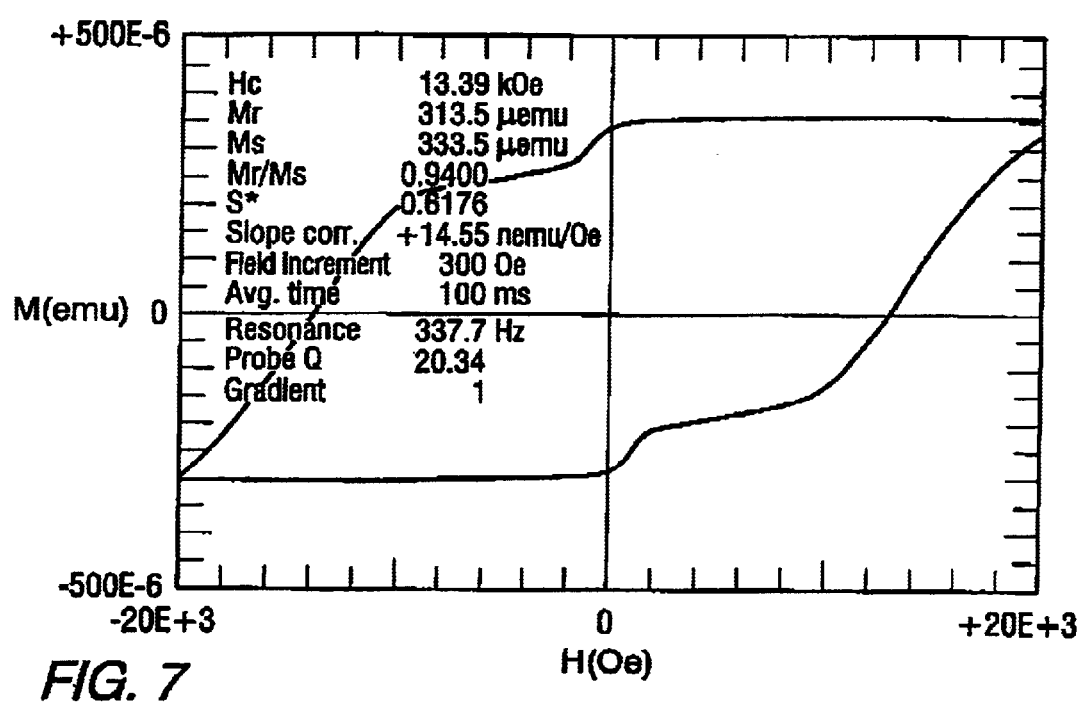
FIG. 7 is a hysteresis loop illustrating magnetic properties of a continuous layer of FePt material after it has been annealed by RF radiation for 35 seconds.

Magnetic properties of as-deposited nanoparticle layers and annealed layers were tested by placing 5×5 mm samples in a standard alternating gradient force magnetometer with the magnetic field in the plane of the substrate. Hysteresis loops were generated as shown in FIGS. 5–7. FIG. 5 is a M-H hysteresis loop illustrating magnetic properties of as-deposited FePt nanoparticles prior to annealing. FIG. 6 is a M-H hysteresis loop illustrating magnetic properties of a layer of FePt material after it has been annealed by RF radiation for 6 seconds. FIG. 7 is a M-H hysteresis loop illustrating magnetic properties of a layer of FePt material after it has been annealed by RF radiation for 35 seconds.

The data shown in FIGS. 5–7 demonstrates that magnetic layers having desirable magnetic properties may be produced by radio frequency annealing in accordance with the present invention. For example, the coercivity of the RF annealed FePt layer shown in FIG. 6 is about 9,000 Oe, while the coercivity of the layer shown in FIG. 7 is about 13,000 Oe. Adjustment of the RF parameters, as well as the particular types of substrate materials and nanoparticle materials, as well as the dimensions thereof, may further optimize the present process.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of annealing a layer of magnetic recording material, the method comprising:
    providing a layer of magnetic recording material; and
    annealing the layer with radio frequency radiation which inductively heats the layer of magnetic recording material.
2. The method of claim 1, wherein the layer of magnetic recording material comprises nanoparticles having an average size of less than about 50 nm.

3. The method of claim 1, wherein the layer of magnetic recording material is provided by chemical deposition.

4. The method of claim 1, wherein the layer of magnetic recording material is provided by sputtering.

5. The method of claim 1, wherein the annealed layer comprises Fe, Co, Pt, Pd, Cr, Ta, Cu, Ag and/or Au.

6. The method of claim 1, wherein the annealed layer comprises FePt, FePd, CoPt and/or CoPd.

7. The method of claim 1, wherein the annealed layer comprises FePt.

8. The method of claim 1, wherein the annealed layer comprises CoCrX where X is Pt, Pd, Ta, Nb, B and/or O.

9. The method of claim 1, wherein the annealed layer comprises multilayers of Fe/Pt, Fe/Pd, Co/Pt and/or Co/Pd.

10. The method of claim 1, wherein the annealed layer has a thickness of less than 500 nm.

11. The method of claim 1, wherein the radio frequency is from about 100 MHz to about 100 GHz.

12. The method of claim 1, wherein the radio frequency is from about 1 to about 20 GHz.

13. The method of claim 1, wherein the radio frequency radiation is applied to the layer of magnetic recording material for a time of less than about 60 seconds.

14. The method of claim 1, wherein the radio frequency radiation is applied to the layer of magnetic recording material for a time of from about 0.1 to about 40 seconds.

15. The method of claim 1, wherein the layer of magnetic recording material is heated to a temperature of from about 200 to about 900° C. during the annealing step.

16. The method of claim 1, wherein the layer of magnetic recording material is converted to an $L1_0$ microstructure during the annealing step.

17. The method of claim 1, further comprising applying a magnetic field to the layer of magnetic recording material during the annealing step.

18. The method of claim 17, wherein the magnetic field is applied in a direction substantially parallel with a plane of the layer of magnetic recording material.

19. The method of claim 17, wherein the magnetic field is applied in a direction substantially perpendicular to a plane of the layer of magnetic recording material.

20. The method of claim 1, wherein the layer of magnetic recording material is provided on a substrate comprising glass, silicon, ceramic, quartz, NiP and/or plastic.

21. The method of claim 1, wherein the layer of magnetic recording material is deposited on an intermediate layer of material, and the intermediate layer is heated by the radio frequency radiation.

22. The method of claim 21, wherein the intermediate layer is a seed layer.

23. The method of claim 1, wherein the layer of magnetic recording material is provided on a substrate, and the layer of magnetic recording material is heated to a higher temperature than the substrate by the radio frequency radiation.

* * * * *

UNITED STATES PATENT AND TRADEMARK OFFICE
CERTIFICATE OF CORRECTION

PATENT NO. : 6,884,328 B2  
DATED : April 26, 2005  
INVENTOR(S) : Dmitri Litvinov et al.

Page 1 of 1

It is certified that error appears in the above-identified patent and that said Letters Patent is hereby corrected as shown below:

Column 6,
Line 1, after "layer 20", "when" should read -- . When --.
Line 11, after "may be", insert -- suitable for --.

Signed and Sealed this

Fourth Day of April, 2006

JON W. DUDAS
*Director of the United States Patent and Trademark Office*